United States Patent
Fathallah (10) Patent No.: US 12,529,031 B2
(45) Date of Patent: Jan. 20, 2026

(54) METHOD FOR PRODUCING MICROCARRIERS FOR CELL CULTURE

(71) Applicant: CARROUCELL, Sainte-Hélène-du-Lac (FR)

(72) Inventor: Tarek Fathallah, Crolles (FR)

(73) Assignee: CARROUCELL, Sainte-Hélène-du-Lac (FR)

( * ) Notice: Subject to any disclaimer, the term of this patent is extended or adjusted under 35 U.S.C. 154(b) by 713 days.

(21) Appl. No.: 17/758,571

(22) PCT Filed: Jan. 6, 2021

(86) PCT No.: PCT/EP2021/050143
§ 371 (c)(1),
(2) Date: Jul. 8, 2022

(87) PCT Pub. No.: WO2021/140129
PCT Pub. Date: Jul. 15, 2021

(65) Prior Publication Data
US 2023/0033382 A1 Feb. 2, 2023

(30) Foreign Application Priority Data
Jan. 9, 2020 (FR) .................. FR2000158

(51) Int. Cl.
*C12N 5/00* (2006.01)
*C01B 33/14* (2006.01)
(Continued)

(52) U.S. Cl.
CPC .......... *C12N 5/0075* (2013.01); *C01B 33/155* (2013.01); *C01B 33/1585* (2013.01);
(Continued)

(58) Field of Classification Search
CPC ............ C12N 2533/12; C12N 2531/00; C12N 5/0667; C12N 5/0075; C12M 25/06;
(Continued)

(56) References Cited

U.S. PATENT DOCUMENTS

| | | | |
|---|---|---|---|
| 8,637,309 B2* | 1/2014 | Oh | C12N 5/0606 435/363 |
| 9,458,431 B2* | 10/2016 | Oh | C12N 5/0696 |
| 2008/0038806 A1 | 2/2008 | Fuhr | |

FOREIGN PATENT DOCUMENTS

| | | | | |
|---|---|---|---|---|
| CN | 105170209 A | * | 12/2015 | |
| DE | 10257102 A1 | | 6/2004 | |
| WO | WO-2025016922 A1 | * | 1/2025 | ............ C12M 25/06 |

OTHER PUBLICATIONS

International Search Report for International Application No. PCT/EP2021/050143, mailed Apr. 8, 2021, 5 pages with English Translation.

(Continued)

*Primary Examiner* — Benjamin A Schiffman
(74) *Attorney, Agent, or Firm* — TraskBritt (57) ABSTRACT

A method for forming microcarriers includes forming liquid drops from a sol-gel solution; depositing the drops in the form of a liquid on a first, preferably hydrophobic support; deforming the drops deposited on the first support; solidifying the drops by gelling and drying, so as to form solid microcarriers; and extracting the solidified microcarriers from the first support.

19 Claims, 5 Drawing Sheets

(51) Int. Cl.
    *C01B 33/155*     (2006.01)
    *C01B 33/158*     (2006.01)
    *C04B 35/624*     (2006.01)
    *C12N 5/0775*     (2010.01)
    *C01B 33/145*     (2006.01)

(52) U.S. Cl.
    CPC .......... *C04B 35/624* (2013.01); *C12N 5/0667* (2013.01); *C01B 33/14* (2013.01); *C01B 33/145* (2013.01); *C12N 2531/00* (2013.01); *C12N 2533/12* (2013.01)

(58) Field of Classification Search
    CPC . C04B 35/624; C01B 33/1585; C01B 33/155; C01B 33/145; C01B 33/14
    See application file for complete search history.

(56) References Cited

OTHER PUBLICATIONS

International Written Opinion for International Application No. PCT/EP2021/050143, mailed Apr. 8, 2021, 8 pages with English Machine Translation.

Wang et al. "Cell adhesion and mechanical stimulation in the regulation of mesenchymal stem cell differentiation" J. Cell. Mol. Med 17(7), pp. 823-832 (Epub May 15, 2013).

Yeatts et al. "Bioreactors to influence stem cell fate: increase of mesenchymal stem cell signaling pathways via dynamic culture systems" Biochim Biophys Acta, 1830(2), pp. 2470-2480 (Feb. 2013).

* cited by examiner

METHOD FOR PRODUCING MICROCARRIERS FOR CELL CULTURE

CROSS-REFERENCE TO RELATED APPLICATIONS

This application is a national phase entry under 35 U.S.C. § 371 of International Patent Application PCT/EP2021/050143, filed Jan. 6, 2021, designating the United States of America and published as International Patent Publication WO 2021/140129 A1 on Jul. 15, 2021, which claims the benefit under Article 8 of the Patent Cooperation Treaty to French Patent Application Serial No. FR2000158, filed Jan. 9, 2020.

TECHNICAL FIELD

The technical field of the disclosure is the production of microcarriers of micrometric or millimetric size, suitable for the adhesion and for the development of cells.

BACKGROUND

Some biological culture methods use culture supports carrying cells. These supports are usually denoted by the term microcarrier. The microcarriers are placed in suspension, in a culture medium, the objective being to bring about the growth of the cells outside their medium of origin. The culture medium is usually subjected to moderate shaking. This allows regular renewal of the culture medium to which the cells are exposed.

The microcarriers intended to be placed in suspension in a culture medium often take the form of microbeads, made of glass, or of plastic or of an organic compound, for example a polymer (for example, polystyrene or a polysaccharide). Generally, the microbeads have previously been subjected to a surface treatment, termed surface functionalization, so as to promote grafting of the cells. It is a question of promoting attachment or adhesion of cells. Microcarriers are frequently used for the culture of adherent cells. They then act as supports, on which the cells can develop and multiply. The functionalization makes it possible to apply a compound suitable for grafting cells. It may be biological compound (for example, collagen, gelatin, elastin, poly-D-lysine, fibronectin) or a molecule allowing positive or negative charges to be introduced at the surface (for example, cationic trimethylammonium, or diethylaminoethyl).

When the cells are placed in suspension in the culture medium, they develop at the surface of the microcarriers. They frequently form, at the surface of the latter, three-dimensional structures, usually denoted "agglomerates" consisting of a superimposition of several layers of cells. Conglomerates then emerge, under the effect of a grouping together of agglomerates. This results in certain drawbacks:
  cell lysis: the cells that are at the center of the agglomerates have reduced access to the culture medium and, in particular, to the oxygen or to the nutrients present in the culture medium. Some may undergo lysis, which reduces the yield of the culture;
  cell differentiation: in the case of the culture of pluripotent stem cells, the formation of agglomerates can promote uncontrolled cell differentiation. However, it is generally desirable to maintain the cells in the stem cell state, or to obtain a controlled differentiation into a predetermined cell type;
  contact inhibition: when synthesis of molecules by cell culture, for example proteins, growth factors, antibodies, is desired, the formation of agglomerates reduces production; and
  detachment difficulty: in some applications, for example applications related to cell therapy, the recovery of the cells is essential. It involves detaching the cells from the microcarriers, so as to obtain single cells (cells isolated from one another) that are viable. The formation of agglomerates makes detachment difficult, the cells recovered not being single cells.

Furthermore, recourse to such microcarriers can bring about other drawbacks:
  the surface functionalization calls for chemical compounds, which may have an effect on the development of the cells; and
  the need for relatively strong shaking in the culture medium, so as to maintain the microcarriers in suspension, which can lead to a cellular stress.

The inventor has developed a new type of microcarrier, which does not comprise the disadvantages of microcarriers in bead form. The microcarriers designed by the inventor have, in addition, significant advantages as subsequently described.

BRIEF SUMMARY

A first embodiment of the disclosure is a method for forming microcarriers, comprising:
  a) forming liquid drops from a sol-gel solution;
  b) depositing the liquid drops on a first, preferably flat, preferably hydrophobic support;
  c) deforming the drops deposited on the first support;
  d) solidifying the drops by gelling and drying, so as to form solid microcarriers; and
  e) extracting the solidified microcarriers from the first support.

According to one embodiment, the support is hydrophobic. The first support is preferably flat. The first support is preferably rigid.

During step b), the liquid drops are preferably spaced apart from one another.

According to one embodiment, during step c), the deforming of the drops is a flattening. The method may be such that step c) comprises a flattening of the drops on the first support, the flattening being obtained spontaneously, during the drying, during step d).

According to one embodiment, step c) comprises applying a second, preferably hydrophobic, support onto the drops, at a distance from the first support, such that the drops are inserted between the first support and the second support, the applying of the second support resulting in a flattening of the drops between the two supports, the spacing between the first support and the second support conditioning the thickness of the microcarriers formed during step d). Preferably, the diameter of the drops formed during step a) and the spacing between the first support and the second support taken into account during step c) are adjusted as a function of a diameter or of a largest diagonal, parallel to the first support, of the microcarriers resulting from step e). Step d) can comprise an arrangement of an assembly, formed at least by the first support, the drops undergoing gelling and the second support, in an oven, so as to promote drying. The temperature of the oven may be between 30° C. and 70° C. The oven may be placed under a partial vacuum. Preferably, during step c), the spacing between the first support and the second support is between 30 µm and 5 mm.

Preferably, the second support is a flat support. Preferably, the second support is hydrophobic. The second support is preferably rigid.

During step a), the drops can be formed at a distance from the first support, the distance preferably being less than 10 mm. During step a), the drops can be formed on contact with the first support.

During step a), the drops formed can have a diameter of between 100 nm and 2 mm.

According to one embodiment, the first support comprises first parts and at least one second part, the first parts being less hydrophobic than each second part, each first part being circled by a second part, the second part forming a closed outline around the first part, such that, during step a), the drops are deposited on each first part, and extend, along each first part, up to the outline of the first part. According to one possibility, each second part is hydrophobic and each first part is less hydrophobic than each the second part that encircles it. According to one possibility, each second part is hydrophobic and each first part is hydrophilic.

According to one embodiment, the first support comprises first parts and at least one second part, the first parts being recessed relative to each second part, each first part being encircled by a second part, the second part forming an outline, taking the form of an edge, closed around the first part, such that, during step a), the drops are deposited on each first part, and extend, along each first part, up to the outline of the first part.

The sol-gel solution can comprise a functionalization compound suitable for formation of an agent for grafting at the surface of the microcarriers, the grafting agent promoting grafting with a predetermined biological entity or a predetermined chemical entity. The predetermined chemical entity may be a molecule. The predetermined biological entity may be a cell, or a protein, or an antibody. The functionalization compound may be mineral or organic. The sol-gel solution may comprise various functionalization compounds.

A second embodiment of the disclosure is a microcarrier, in particular obtained by carrying out a method according to the first embodiment of the disclosure. The microcarrier may comprise a flat first surface and a second surface, the flat first surface and the second surface being linked to one another by a lateral surface forming a border of the microcarrier. The second surface may be flat, and parallel to the first surface. The second surface may be curved, and may extend opposite the first surface. The diameter, or the largest diagonal, of the flat first surface and/or of the second surface is preferably less than 5 mm or less than 1 mm, and preferably greater than 5 µm. Preferably, the thickness of the microcarrier, corresponding to the distance between the flat first surface and the second surface, is less than 1 mm.

A third embodiment of the disclosure is a use of a microcarrier according to the second embodiment of the disclosure for culturing cells, with the exclusion of embryonic stem cells of human origin, the microcarrier being intended to be placed in suspension in a biological medium, for example a culture medium.

The disclosure will be understood more clearly on reading the summary of the examples of implementation presented, in the rest of the description, in connection with the figures listed below.

DETAILED DESCRIPTION

Figure 1A:
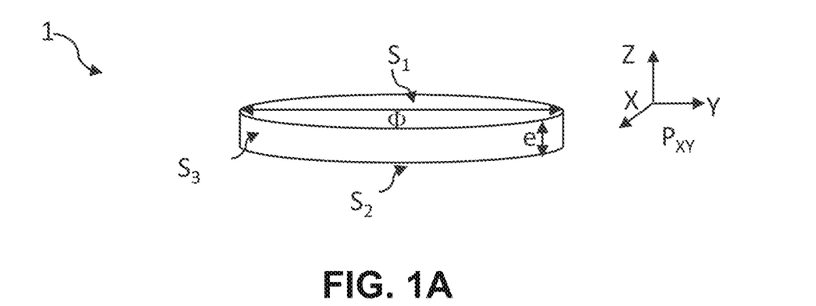
FIG. 1A represents an example of a microcarrier according to embodiments of the disclosure.

Represented in FIG. 1A is an example of a microcarrier according to embodiment(s) of the disclosure. The microcarrier comprises two surfaces that are flat, or considered to be flat, opposite one another. Thus, the microcarrier has a flat, or substantially flat, first surface $S_1$ and a second flat, or substantially flat, surface $S_2$. The flat first surface and the flat second surface are parallel to one another, or substantially parallel to one another.

The term "substantially parallel" is intended to mean parallel taking into account an angular tolerance, for example of less than or equal to ±20°, and preferably less than or equal to ±10°.

The term "substantially flat surface" is intended to mean flat, while accepting surface elements having a local flatness defect, within a limit of ±10° relative to the rest of the surface.

The first surface $S_1$ has a diameter $10_1$, or a largest diagonal, less than or equal to 20 mm, and preferably less than or equal to 10 mm, and preferably less than or equal to 1 mm. The same is true for the second surface $S_2$. The diameter $10_1$ is preferably greater than 5 µm or than 10 µm. The diameter $10_1$ is preferably between 50 µm and 1 mm, and more preferably between 100 µm and 1 mm. The first surface $S_1$ and the second surface $S_2$ extend parallel to a main plane $P_{XY}$. The microcarrier 1 comprises a lateral surface $S_3$, extending between the first surface $S_1$ and the second surface $S_2$. The lateral surface $S_3$ extends according to a thickness e around a transverse axis Z perpendicular to the main plane PXY.

Figure 1B:
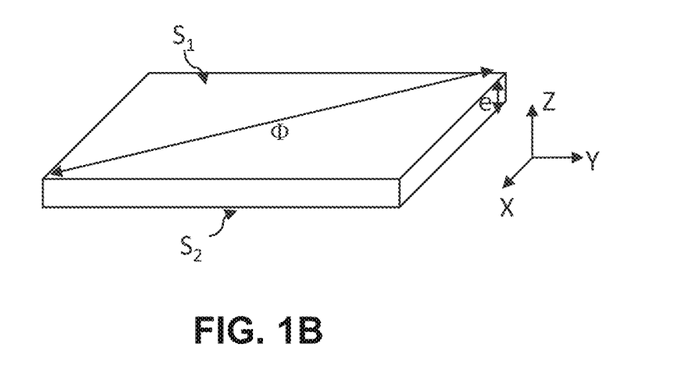
FIG. 1B shows another example of a microcarrier according to embodiments of the disclosure.

FIG. 1A corresponds to a preferred embodiment, according to which the microcarrier 1 has a cylinder-of-revolution geometry. The first surface $S_1$ and the second surface $S_2$ have a circular shape, of revolution, the lateral surface $S_3$ being an annular surface. Other cylindrical configurations are possible, for example a polygonal-based cylinder, for example in the shape of a quadrilateral, as represented in FIG. 1B.

Regardless of the configuration, the thickness e of the microcarrier 1 is preferably:

less than one fifth of the diameter (or of the largest diagonal), and preferably greater than one tenth, and preferably than one twentieth of the diameter (or of the largest diagonal) $10_1$.

When the microcarrier is a cylinder of revolution, because of this small thickness, such a microcarrier has the shape of a disk of small thickness. The thickness and the diameter are adjusted so as to avoid breaking of the microcarriers.

Thus, regardless of the configuration, the microcarrier is essentially in the form of two surfaces $S_1$ and $S_2$, extending opposite one another, the area of the lateral surface $S_3$ being negligible. The two surfaces $S_1$ and $S_2$ can notably be flat or substantially flat.

Preferably, the microcarrier is transparent.

The inventor chose such a geometry because of advantages that it confers:

an increased specific surface area, relative to the bead microcarriers normally used in the prior art. The specific surface area corresponds to the available surface area per unit mass:

for a spherical microcarrier, made of glass, the diameter, which is between 160 μm and 180 μm, the specific surface area ranges between 340 cm²/g and 360 cm²/g, and for a cylinder-of-revolution microcarrier, made of glass, the specific surface area depends on the thickness e. For thicknesses of 5 μm, 10 μm and 20 μm, the specific surface area reaches, respectively, 3338 cm²/g, 1722 cm²/g and 888 cm²/g. On this type of microcarrier, the available surface area corresponds to the cumulative area of the flat surfaces $S_1$ and $S_2$. The higher the specific surface area, the higher the amount of cells that can be cultured, per unit mass of microcarrier; and a better ability to float, owing to the high specific surface area, conferring a high lift. A consequence is that, with microcarriers according to embodiments of the disclosure, the obtaining of a suspension in the culture medium does not require as much shaking as when using bead microcarriers. This significantly reduces the stress on the cells developing at the surface of the microcarriers, due to an increased lift. Indeed, the impact of shaking on cell development has already been described, for example in the publication Wang, Y. "Cell adhesion and mechanical stimulation in the regulation of mesenchymal stem cell differentiation," J. Cell. Mol. Med. 17(7), pp. 823-832, or in the publication Yeats, A. "Bioreactors to influence stem cell fate: augmentation of mesenchymal stem cell signaling pathways via dynamic culture systems," Biochim. Biophys. Acta. 1830(2), pp. 2470-2480. The inventor has estimated that a slower shaking allows better stability of the cell environment. A reduction in the shaking also limits the risk of shock between several microcarriers in suspension in one and the same culture medium. This also limits the hydrodynamic stress to which the cells are subjected.

Other advantages will be described in relation to the experimental tests carried out and subsequently described.

The microcarriers according to embodiments of the disclosure can be obtained by carrying out a method of sol-gel type, sol-gel being an abbreviation of solution-gelation. It is a chemical process known to those skilled in the art, allowing the low-temperature manufacture of glasses or ceramics. Such a process comprises the use of a sol-gel solution, formed:

of a molecular precursor of a metal or of a metalloid, for example an organometallic compound or a metal salt;

from an organic solvent;
from water; and
from an acid or basic catalyst.

In the presence of water, a network of oxides forms, by means of hydrolysis-condensation reactions, trapping the organic solvent so as to form a gel. The gel then undergoes drying, to remove the organic solvent present in the gel. The drying can be of evaporative type, at a pressure of less than or equal to atmospheric pressure, so as to form a dry gel, usually denoted by the term "xerogel," which is in the form of a monolithic solid.

The molecular precursor may be, for example, an organometallic compound of a metal or of a metalloid, for example a metal alkoxide of formula $M(OR)_n$, where M is a metal or a metalloid, and R is an organic group.

The metal M may be, for example, a transition metal, a lanthanide: it can be Ti, V, Cr, Mn, Fe, Co, Ni, Cu, Zn, Y, Zr, Nb, Mo, Ru, Rh, Pd, Ag, Cd, Hf, Ra, W, Re, Os, Ir, Pt, La, Ce, Pr, Nd, Sm, Eu, Gd, Tb, Dy, Er, Yb, Al, Ga, In, Ge, Sn, Pb.

The metalloid element can be chosen from Si, Se and Te.

R can be an alkyl group, comprising, for example, between 1 and 10 carbon atoms, or a phenyl group.

n is a natural integer corresponding to the number of ligands bonded to M, which corresponds to the valency of M.

The molecular precursor is placed in an organic solution, for example an alcoholic solution. The organic solvent may be an aliphatic or aromatic monoalcohol, or a diol.

The sol-gel solution can also comprise a catalyst, and/or water, or compounds that make it possible to act on the porosity, for example a surfactant.

According to one embodiment, the sol-gel solution comprises a functionalization compound, notably an organic compound, the function of which is to form a grafting agent. The term "grafting agent" is intended to mean a molecule or a functional group capable of promoting an attachment, by grafting, of a chemical or biological element to the surface of the xerogel resulting from the implementation of the sol-gel method. The chemical or biological element is predetermined. It may be a molecule, a cell, or a protein or another organic compound, for example a growth factor or an antibody. For applications linked to cell culture, the grafting agent promotes grafting of a cell, of predetermined type. The grafting agent can then be collagen, or polylysine, or a milk protein. However, due to regulatory constraints or quality control constraints, it is sometimes preferable to avoid molecules of animal origin. It is, therefore, possible to use a functionalization compound comprising an epoxy function, the latter being suitable for the formation of chemical bonds with amine functions, the latter being present in most cell membranes. The incorporation of an epoxy function can be carried out via a compound of glycidoxypropyltrimethoxysilane type, usually denoted by the acronym GPTM. An amine function can also be integrated into the sol-gel, by means of a compound of APTES (3-aminopropyltriethoxysilane) type. Such a compound allows a formation of positive charges at the surface of the microcarriers, which promotes attachment of cells having surface negative charges. An amine function is suitable for the formation of peptide bonds with the amino acids of the cell wall.

The possibility of adding a functionalization compound to the sol-gel solution constitutes a valuable advantage, since it avoids performing a post-production functionalization, which is required in the prior art beads. This makes it possible to produce microcarriers specific to a predefined application, taking into account the chemical or biological element intended to be attached to the microcarriers, and/or the medium in which the microcarrier is intended to be placed.

The sol-gel microcarriers obtained have a density that is generally less than 2, and preferably less than 1.8. The density is preferably strictly greater than 1 and advantageously between 1 and 1.4 and even more advantageously between 1.02 and 1.04. Such a density confers good flotation on the microcarriers in aqueous culture medium.

Figure 2A:
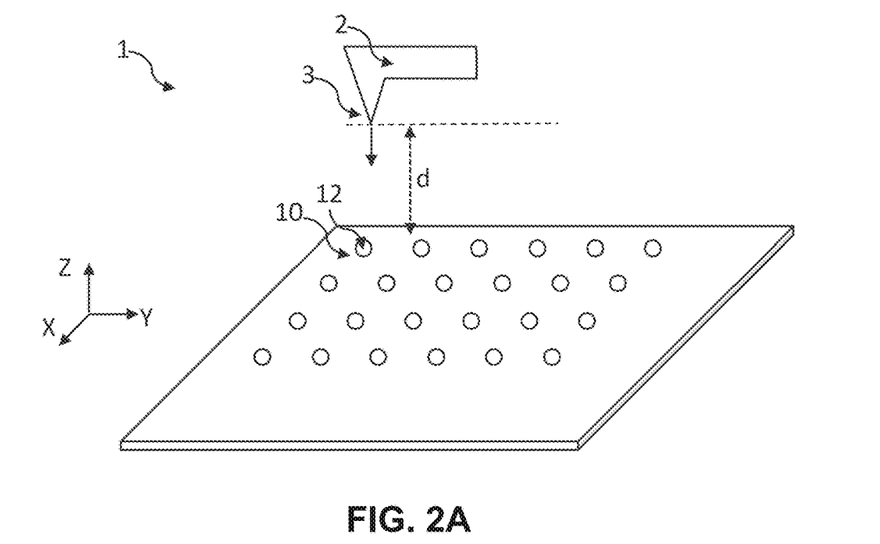
FIG. 2A illustrates a step of forming drops on a first, preferably hydrophobic, support.
Figure 2B:
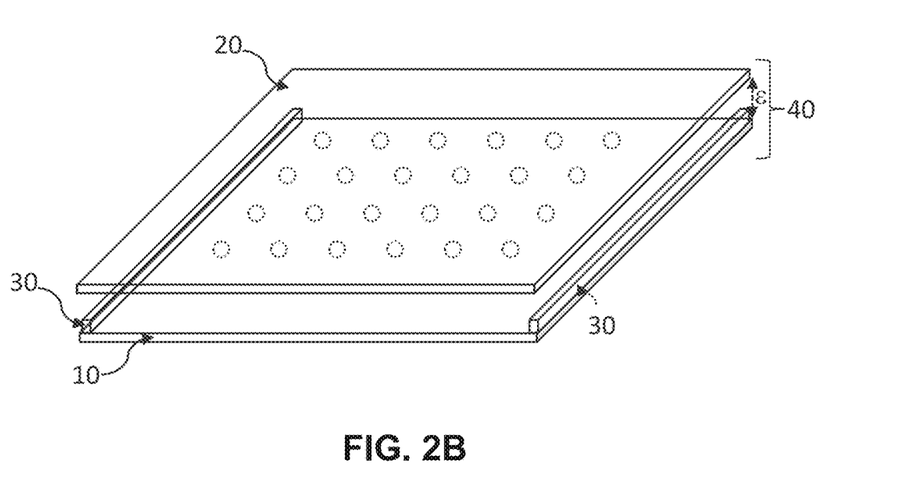
FIG. 2B shows a diagram of an apposition of a second, preferably hydrophobic, support opposite the first support.
Figure 3:
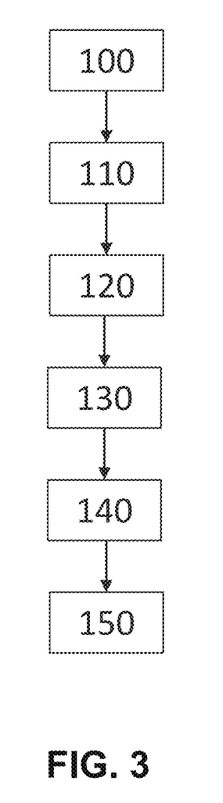
FIG. 3 shows a diagram of the main steps of a method for forming microcarriers.

A first example of a method for producing a microcarrier, by the sol-gel process, is presently described, in connection with FIGS. 2A and 2B. The main steps are represented in FIG. 3.

Step 100: Drop Formation

A sol-gel solution 2, as described above, is introduced into a distributor 3, for forming drops 12, and preferably calibrated drops. The drops are preferably microdrops, the volume of which is between $5 \times 10^{-10}$ nl and 15 µl.

The diameter of the drops formed is preferably between 100 nm and 5 mm, or between 100 nm and 1 mm.

Figure 2C:
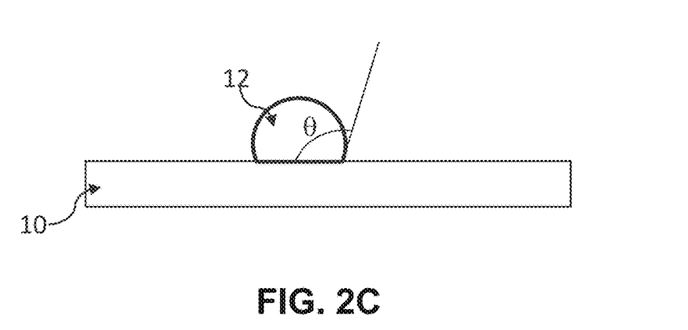
FIG. 2C is a diagram illustrating the definition of a contact angle.

The distributor 3 is placed at a distance from or in contact with a first support 10. The first support 10 is preferably flat and preferably hydrophobic. In this example, the first support is a flat support, which corresponds to a preferred embodiment: it is a rigid plate. The hydrophobic nature of a material can be characterized by a contact angle θ, as represented in FIG. 2C. The contact angle θ is measured in the presence of a drop of the sol-gel solution used. Preferably, the contact angle θ is between 70° and 150°. This makes it possible to avoid excessive spreading of the drops on the first support. The material forming the first support 10 may be, for example, glass, or polypropylene, or Teflon, or silicon. Preferably, the first support 10 is hydrophobic or has been previously hydrophobically treated.

The distance d between the distributor and the first support 10 is preferably less than 10 cm. The drops can be formed on contact with the first support 10. The smaller the distance, the better the accuracy as regards the location of the drops.

During step 100, the drops formed on the first support 10 are spaced apart from one another. The spacing between two adjacent drops is proportioned such that, during the flattening of the drops, resulting from the implementation of step 110, the drops remain spaced apart from one another.

The fact that the first support 10 is hydrophobic makes it possible to avoid too great a spreading of the drops 12.

Step 110: Drop Flattening

Following the formation of the drops, a second, preferably hydrophobic, support 20 is applied parallel to the first support 10. The second support 20 is preferably flat and preferably rigid. The second support 20 is applied facing the first support 10, spaced apart from the latter by a spacing c dependent on the thickness e of the microcarriers that it is desired to form. Taking into account a contraction that occurs during drying (cf. step 120), the spacing c between the first support 10 and the second support 20 is greater than the thickness e of the microcarriers 1 resulting from the implementation of the method. The spacing c between the first support 10 and the second support 20 can be provided by placing spacers 30 between the first support 10 and the second support 20. The spacing c between the first support 10 and the second support 20 can be between a few µm, for example 5 µm, and 5 mm or preferably between 50 µm and 2 mm or 1 mm.

The application of the second support 20 results in a flattening of the drops 12. After they have been applied to the first support 10, the drops 12 rapidly form a gel. It is, therefore, preferable for the flattening to be carried out before the gelling is too advanced, as soon as all the drops 12 have been formed. Thus, step 110 is carried out as quickly as possible after step 100. The solvent used in the sol-gel composition can be chosen to be not very volatile, so as to be able to defer the application of the second support 20. Early drying and gelling of the drops that would occur before the application of the second support 20 is thus avoided. It is also possible to reduce the temperature or to increase the pressure so as to be able to delay the gelling of the drops deposited on the first support 10.

Step 120: Gelling and Drying

During the gelling and the drying, the assembly 40 formed by the first support 10 and the second support 20 is preferably placed in an oven, so as to finalize the gelling and to facilitate drying of the gel. The temperature of the oven may be, for example, between 30° C. and 80° C. The oven may be placed at a pressure less than atmospheric pressure, for example at a pressure of between −200 mbar and −970 mbar relative to the atmospheric pressure. This significantly accelerates the drying. The time spent in the oven may be between 10 minutes and 24 hours.

During the drying, the gel resulting from each drop solidifies, so as to form a solid monolithic microcarrier 1. Thus, each drop 12 deposited during step 100 leads to the formation of a solid monolithic microcarrier 1.

During the drying, the microcarriers undergo a contraction, this being a phenomenon known in the sol-gel field. Thus, during drying, the thickness e of each microcarrier 1 decreases, the decrease being, for example, by 50% when the thickness is 100 µm or 50 µm. Thus, following drying, the microcarriers 1 are only in contact with a single support, for example the first support 10 on which they lie by gravity. Some microcarriers may remain attached to the second support 20. When the second support 20 is hydrophobic, the microcarriers are easily removed.

The fact that each support is hydrophobic facilitates a loss of contact between each microcarrier and the support that faces it, during the contraction. The facing support is the support opposite the support supporting, by gravity, the forming microcarriers. Indeed, in the absence of hydrophobic treatment, bonds, for example OH bonds, can form between the gel and the supports. This leads to a risk of breaking during loss of contact, when the microsupport contracts under the effect of the drying. The hydrophobic treatment of each support limits the risk of breakage.

Step 130: Recovery of the Microcarriers

Following drying, the microcarriers 1 can be easily separated from the first support 10 or from the second support 20, due to the hydrophobic nature of the supports. During the recovery, the microcarriers 1 can be collected on a recovery support, which is preferably flexible, for example a cloth. It may be a porous nylon filter. The porosity is optimized so as to retain the microcarriers 1 while at the same time allowing the removal of debris, for example residues of microcarriers that have broken during the implementation of the method, the latter passing through the recovery support. For example, when the diameter (or the largest diagonal) of the microcarriers is equal to 600 µm, the particle size of the recovery support may be 400 µm. When the diameter of the microcarriers is 200 µm, the particle size may be 150 µm.

The fact that the first support 10 is hydrophobic makes it possible to avoid formation of OH bonds between the microcarriers, resulting from the implementation of the method, and the first support 10. This facilitates the recovery of the microcarriers.

Step 140: Washing

The microcarriers recovered during step 130, placed on the recovery support, are washed, for example using a bath in a washing solution allowing removal of the residual acids present in the sol-gel solution or possible unreacted precursors. The washing solution may be an aqueous solution, for example an aqueous solution comprising 50% by mass of isopropanol. The method may successively comprise several baths, for example two or three successive baths.

Step 150: Post-Washing Drying

Following step 140, the microcarriers are subjected to drying. The drying can be carried out at ambient temperature or at a higher temperature, for example up to 100° C. or above. The drying temperature can be reduced if a partial vacuum is formed around the microcarriers. During drying, the microcarriers can be placed on the recovery support and the entire assembly is placed in an oven.

According to one possibility, the drying can be carried out by applying various successive levels of pressure in the oven, for example by gradually reducing the pressure. This makes it possible to reduce the drying time. The temperature is, for example, 50°. The drying time depends on the temperature and pressure conditions. It may be between 10 minutes and 5 h, or even more.

Figure 4A:
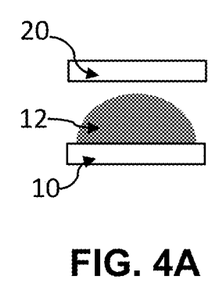
FIGS. 4A to 4C show a deformation of a drop according to one particular embodiment.
Figure 4B:
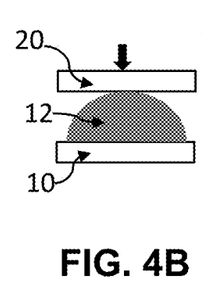
Figure 4C:
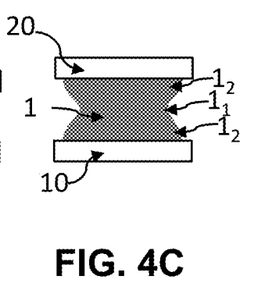

According to one variant of the first embodiment, the spacers 30 placed between the two supports during step 110 are compressible. The spacers are proportioned such that, during the apposition of the second support 20 facing the first support 10, each drop 12 is not in contact with the second support 20, cf. FIG. 4A. During step 110, a pressure is exerted on the second support 20, so as to temporarily move it closer to the first support 10. The second support 20 then comes into contact with each drop 12, cf. FIG. 4B. When the pressure is released, the second support 20 moves away from the first support 10, cf. FIG. 4C. According to this variant, step 110 corresponds to a deformation of the drop 12. When the pressure is released, the drop 12 remains in contact with the second support 20, by surface tension of the liquid. Thus, when the pressure is released, the drop 12 stretches along the transverse axis Z. This results in a particular microcarrier shape, comprising a narrowing $1_1$ extending between two ends $1_2$. When the microcarriers are cylinders of revolution, the shape resembles that of an hourglass.

Figure 4D:
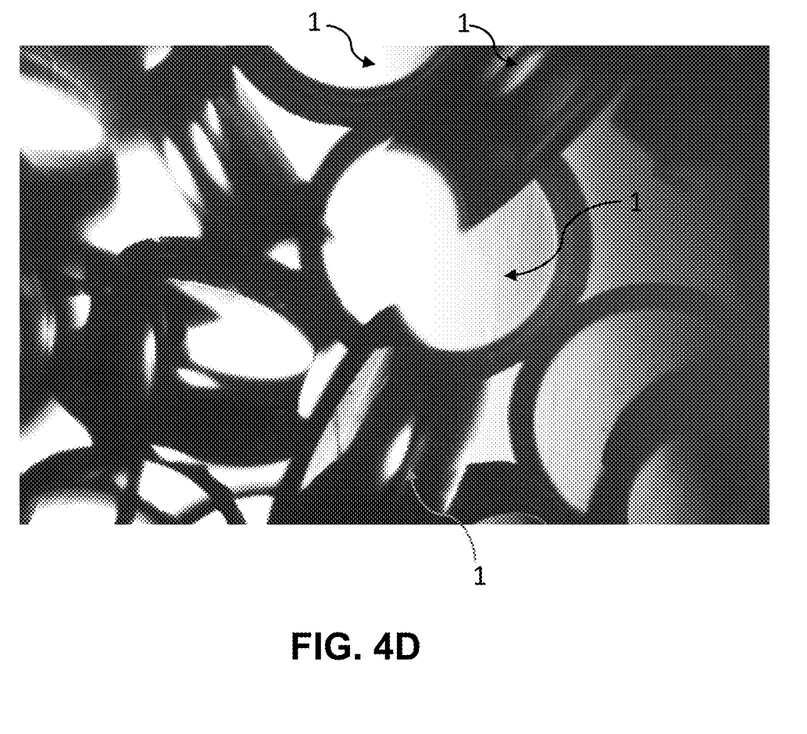
FIG. 4D shows examples of microcarriers obtained via the embodiment represented diagrammatically in FIGS. 4A to 4C.

FIG. 4D is a photograph of microcarriers 1 in the shape of an hourglass, obtained by implementing such a variant.

According to a second embodiment, the drops 12 are deposited on the first support 10, as described in relation to step 100 of the first embodiment, cf. FIG. 2A.

Figure 2D:
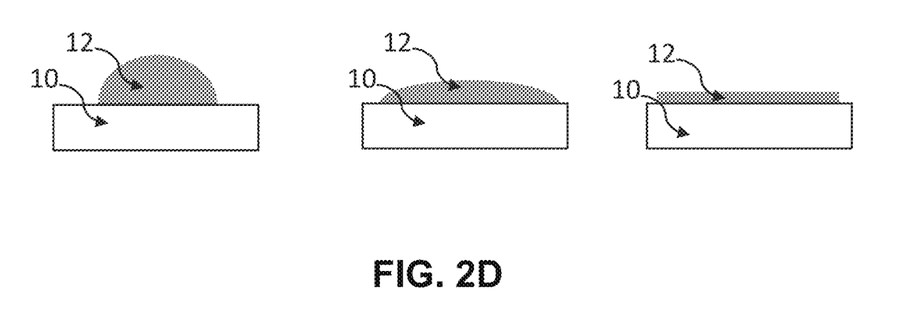
FIG. 2D shows a diagram of a flattening of a drop during drying.

Contrary to the first embodiment, during step 110, the flattening of the drops 12 does not result from the apposition of a second support 20. The flattening of the drops is spontaneous. It takes place notably gradually, during the drying, cf. FIG. 2D. This makes it possible to obtain microcarriers 1, the thickness of which is between a few μm, for example 2 μm or 3 μm, up to several μm, or even hundreds of μm. This embodiment is particularly suitable for obtaining microcarriers 1, the thickness of which is fine, typically less than 30 μm, or even less than 10 μm. This makes it possible to have microcarriers 1 having good floatability.

The geometry of the microcarriers 1 obtained according to the second embodiment is not as cylindrical as that of the microcarriers obtained according to the first embodiment. In particular, the face opposite the face lying on the first support 10 may be slightly curved.

According to this embodiment, the drying and gelling step 120 can be carried out in the open air, without going through an oven.

The second embodiment is particularly suitable for obtaining microcarriers of small thickness, for example less than 10 μm. In general, the second embodiment makes it possible to obtain a very high diameter/thickness ratio, which is conducive to good flotation. The first embodiment allows a better control of the flatness of the microcarriers. It is particularly suitable for microcarriers with a large diameter, typically greater than 100 μm.

Steps 130 to 150 of the second embodiment are identical to those described in relation to the first embodiment.

The second embodiment is preferably carried out by reducing the concentration of precursors in the sol-gel solution relative to the first embodiment. Preferably, in the second embodiment, the contact angle θ of each drop is smaller than in the first embodiment, this being in order to promote spreading of the drop on the first support 10. In order to reduce the contact angle θ, it is possible to use a solvent that has a lower surface tension than that of water, for example an alcohol of ethanol or isopropanol type. It is also possible to add a surfactant to the sol-gel composition.

Figure 4E:
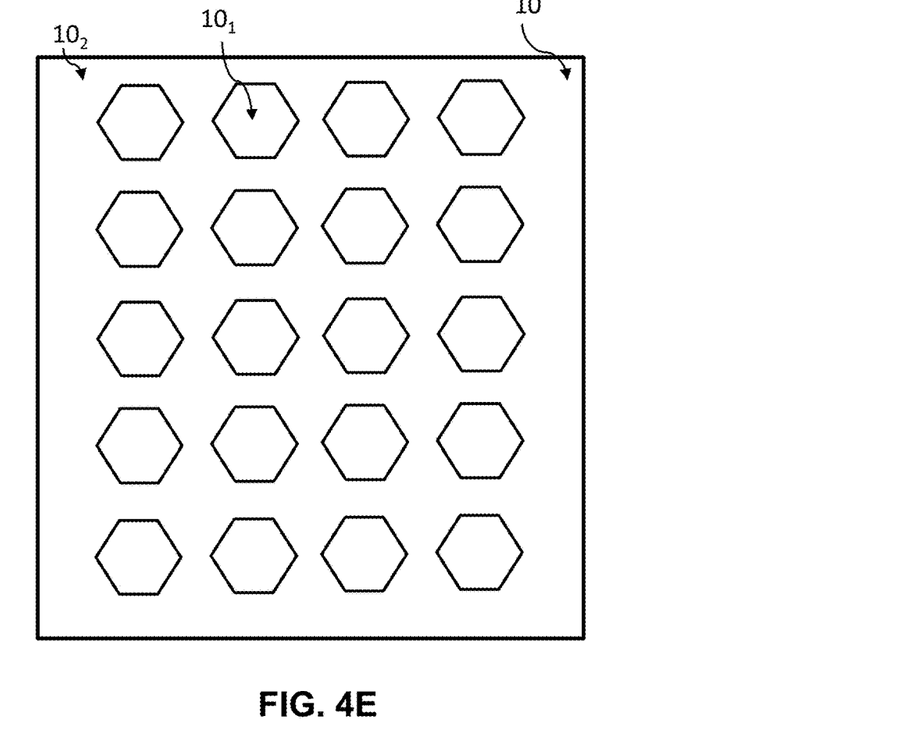
FIG. 4E shows a diagram of a first substrate structured between hydrophobic parts delimited by highly hydrophobic zones.

Regardless of the embodiment, the first support 10 can be structured such that, under the effect of the flattening, each drop 12 spreads, on the first support 10, according to a predetermined shape, depending on the structuring of the first support. An example of such a support is represented in FIG. 4E. The structuring of the first support 10 makes it possible to form first parts $10_1$, intended to receive the drops, and second parts $10_2$. Each first part is delimited by a second part, such that a second part forms an outline closed around each first part.

Figure 1C:
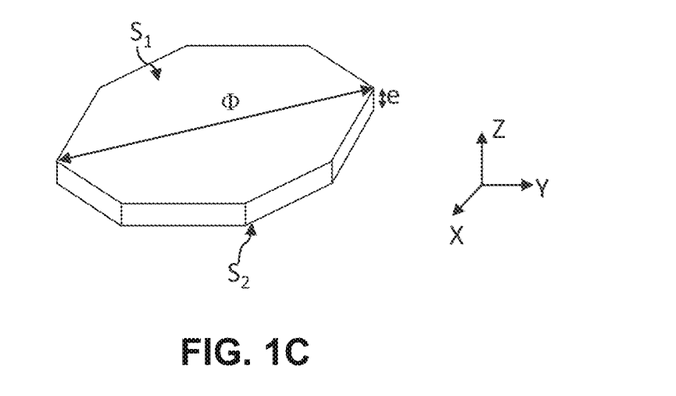
FIG. 1C shows another example of a microcarrier according to embodiments of the disclosure.

According to one possibility, the first support 10 can be microstructured, so as to comprise recessed first parts $10_1$ of predetermined shapes, for example polygons of quadrilateral type or hexagons, and delimited by an edge, formed by a second part $10_2$. The drops are deposited on each first part $10_1$, and extend up to the edge delimiting the first part. Microcarriers as represented in FIG. 1B or FIG. 1C, the shape of which corresponds to the shape of each first part $10_1$, are thus obtained.

According to another possibility, the structuring of the first support 10 forms first parts $10_1$ that are less hydrophobic than each second part $10_2$. The hydrophobicity of a material is a notion known to those skilled in the art and can be determined by measuring the contact angle. The higher the angle, the more hydrophobic the material is with regard to the solution forming the drop. The first parts $10_1$ may be not very hydrophobic or may be hydrophilic. Each second part $10_2$ is preferably hydrophobic. The term "not very hydrophobic" is intended to mean a part wherein the contact angle θ is at least 5° or 10° smaller relative to the contact angle on the most hydrophobic part.

According to this embodiment, each first part $10_1$ is delimited by a second part $10_2$, such that, during step 110, the drop spreads along the first part on which it has been deposited. This variant allows a better control of the shape of the microcarrier. It also makes it possible to obtain microcarriers, the shape of which is controlled by the structuring of the first support 10.

Experimental Tests

A first series of tests was carried out, the experimental conditions being described below:

Dispenser: Vermes MDV 3200 A metering valve equipped with a Vermes N11-150 nozzle to form sol-gel microdrops. The dispenser was mounted on a Janome 200 mm/200 mm three-axis robot, allowing movement of the dispenser parallel to the first support 10.

First support 10: glass plate 200 mm×170 mm, 6 mm thick, hydrophobically pretreated by exposure to dichlorodimethylsilane.

Second support 20: identical to the first support.

Spacing ε between the first support 10 and the second support: 140 µm, the spacing is obtained by placing spacers 30 of adhesive scotch tape type.

Precursor: 98% tetramethoxysilane (Alfa Aesar).

Solvent: Technical isopropanol (Alfa Aesar).

Catalyst: HCl 6M (Sigma Aldrich).

Mineral functionalization compound: Hydroxyapatite Ca5(OH)(PO$_4$)$_3$ (Sigma Aldrich).

Organic functionalization compound: Bovine type 1 collagen: 10 mg/ml (Vornia Ltd).

10 ml of tetramethoxysilane was poured into a 50 ml beaker and kept stirring at ambient temperature. A solution of 5 ml of deionized water was prepared, to which 0.1 ml of HCl was added. The solution was slowly poured into the beaker containing the tetramethoxysilane (10 ml). Since hydrolysis of tetramethoxysilane is exothermic, the water+HCl mixture is poured in at a rate of 2.5 ml/min. 20 ml of water were then added to the beaker. 3 ml of a hydroxyapatite solution were added, and also 4 ml of collagen solution. The hydroxyapatite solution was obtained by dissolving 200 mg of hydroxyapatite powder in 2.5 ml of deionized water and 0.5 ml of HCl, HCl facilitating dissolution of the hydroxyapatite powder.

The sol-gel solution, the preparation of which is described in the preceding paragraph, was introduced into a syringe of the metering valve, the regulating parameters of which are the following: rising: 0.25 ms; falling: 0.35 ms; open time: 2 ms; needle lift: 30; delay: 7 ms; air pressure: 0.5 bar. These parameters are adjusted case by case by those skilled in the art.

A first hydrophobic glass plate, acting as first support 10, was placed on the robot mentioned above, the latter being programmed to move parallel to the first glass plate, while describing lines spaced apart from one another by a distance of 3 mm. The drops are formed at a distance of 2 mm from the hydrophobic plate. The spacing between two adjacent drops, placed on one and the same line, was 2 mm. The volume of each drop was 500 nl.

An adhesive film, acting as spacer 30, was placed at the four corners of each glass plate. The thickness of the adhesive thread was 0.14 mm.

The number of drops formed was 5000. After all the drops had been formed, a second hydrophobic glass plate, acting as second support 20, was carefully placed above the first glass plate, in contact with the adhesive film, so as to flatten the drops, as described in relation to step 110.

The two glass plates, confining the drops undergoing gelling/drying, were then placed in an oven at 50° C. The temperature of 50° C. was then maintained and the pressure was gradually reduced according to eight pressure steps, respectively of −200 mbar, −400 mbar, −500 mbar, −600 mbar, −700 mbar, −800 mbar, −900 mbar, and −970 mbar relative to the atmospheric pressure. The duration of each step was 15 minutes. Solid microcarriers thus formed between the two glass plates, resulting from the gelling and drying of the beads.

After drying, the plates were separated and the microcarriers were recovered on a porous nylon filter, the pores measuring 400 µm in diameter. The filter, retaining the microcarriers, was placed in a crystallizer Z, comprising isopropanol diluted to 50% (mass fraction) in deionized water, so as to perform washing. The duration of the washing was 2 hours. The washing was repeated three times. Following the washing operations, the filter retaining the microcarriers was dried in an oven at 100° C. for 1 hour 30 minutes.

The microcarriers resulting from the implementation of the method had a thickness of 70 µm and a diameter of 700 µm.

Figure 5:
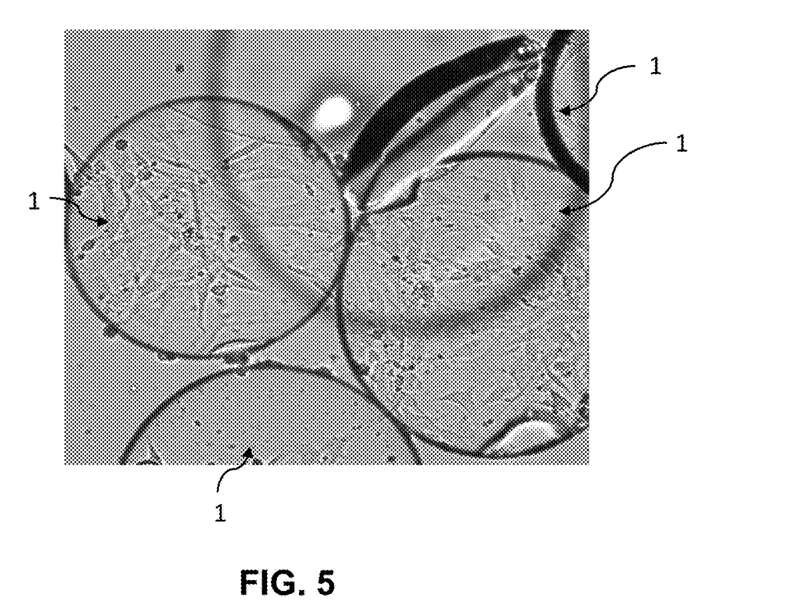
FIG. 5 shows an example of cells having developed on microcarriers.

The microcarriers were diluted for cell culture applications. A culture of stem cells derived from human adipose tissue (ASC: adipose-derived stem cells) was carried out. FIG. 5 shows a photograph of culture microcarriers after 72 hours of static culture in a culture medium of "mesenchymal stem cell growth medium 2" type (Promocell). The development of cells, on the microcarriers, in a monolayer was confirmed by microscopy.

During these tests, other advantages conferred by the microcarriers according to embodiments of the disclosure were observed:

a flat culture surface, suitable for the development of cells under conditions that are the same as in culture supports of culture flasks or petri dish type normally used. These are culture conditions different than those resulting from microcarriers in bead form. Indeed, on the latter, the culture surface is highly curved. On microcarriers in bead form, the cells develop by forming aggregates. It is considered that the cells tend to favor the establishment of bonds between cells to the detriment of bonds with the surface of the bead. On the microcarriers having flat surfaces, the cells develop by forming a monolayer, since they favor bonds with the flat surface of the microcarrier;

easy recovery of the cells cultured on each microcarrier. The cells develop by forming a monolayer, thereby facilitating their detachment from the microcarriers. The separation of the cells from each microcarrier can be facilitated by an enzyme, for example TrypLE (Microfischer);

recovery of individual (or single) cells, which can be used to be re-seeded for a new culture;

a behavior, after culture, close to cells cultured in culture flasks or in a petri dish. Tests have shown that, after recovery of the cells and re-seeding thereof in a culture flask, the cells extend in a fibroblastic form, characteristic of mesenchymal stem cells. Their capacity for osteogenic, chondrogenic and adipogenic differentiation remains intact. The cells indeed remain pluripotent stem cells, contrary to what can be observed when the cells form agglomerates. In addition, a content of senescent cells similar to that obtained during a 2D culture on conventional flasks has been observed;

a content of viable cells greater than that obtained using microcarriers in bead form, notably due to a better access to the nutrients and to oxygen in the culture medium; and better productivity of the cells, due to the fact that the latter are cultured in the form of monolayers, without agglomerate formation. The drawback of contact inhibition described in relation to the prior art is thus avoided.

Embodiments of the disclosure may, in a nonlimiting manner, be implemented for applications related to cell culture.

The invention claimed is:

1. A method for forming microcarriers, comprising:
a) forming liquid drops from a sol-gel solution;
b) depositing the liquid drops on a first support;

c) deforming the drops deposited on the first support;
d) solidifying the drops by gelling and drying, so as to form solid microcarriers; and
e) extracting the solid microcarriers from the first support.

2. The method as claimed in claim 1, wherein the first support is hydrophobic.

3. The method as claimed in claim 1, wherein, during c), the deforming of the drops is a flattening.

4. The method as claimed in claim 3, wherein c) comprises a flattening of the drops on the first support, the flattening being obtained spontaneously, during the drying, during d).

5. The method as claimed in claim 1, wherein c) comprises applying a second, preferably hydrophobic, support onto the drops, at a distance from the first support, such that the drops are inserted between the first support and the second support, the applying of the second support resulting in a flattening of the drops between the two supports, a spacing between the first support and the second support conditioning a thickness of the microcarriers formed during d).

6. The method as claimed in claim 5, wherein a diameter of the drops formed during a) and the spacing between the first support and the second support taken into account during c) are adjusted as a function of a diameter of a largest diagonal, parallel to the first support, of the microcarriers resulting from e).

7. The method as claimed in claim 5, wherein d) comprises placing an assembly, formed at least by the first support, the drops undergoing gelling and the second support, in an oven, so as to promote drying.

8. The method as claimed in claim 7, wherein the temperature of the oven is between 30° C. and 70° C.

9. The method as claimed in claim 7, wherein the oven is placed under a partial vacuum.

10. The method as claimed in claim 5, wherein, during c), the spacing between the first support and the second support is between 30 μm and 5 mm.

11. The method as claimed in claim 1, wherein, during a), the drops are formed at a distance from the first support, the distance being less than 10 mm.

12. The method as claimed in claim 1, wherein, during a), the drops are formed on contact with the first support.

13. The method as claimed in claim 1, wherein, during a), the drops formed have a diameter of between 100 nm and 2 mm.

14. The method as claimed in claim 1, wherein the first support comprises first parts and at least one second part, the first parts being less hydrophobic than each second part, each first part being encircled by a second part, the second part forming an outline closed around said first part, such that, during a), the drops are deposited on each first part, and extend, along each first part, up to the outline of said first part.

15. The method as claimed in claim 14, wherein:
each second part is hydrophobic and each first part is less hydrophobic than the second part which encircles it;
or each second part is hydrophobic and each first part is hydrophilic.

16. The method as claimed in claim 1, wherein the first support comprises first parts and at least one second part, the first parts being recessed relative to each second part, each first part being encircled by a second part, said second part forming an outline, taking the form of an edge, closed around said first part, such that, during a), the drops are deposited on each first part and extend, along each first part, up to the outline of said first part.

17. The method as claimed in claim 1, wherein the sol-gel solution comprises a functionalization compound suitable for formation of an agent for grafting to a surface of the microcarriers, the grafting agent promoting grafting with a predetermined biological entity or a predetermined chemical entity.

18. The method as claimed in claim 17, wherein the functionalization compound is mineral or organic.

19. The method as claimed in claim 17, wherein the sol-gel solution comprises various functionalization compounds.

* * * * *